Patented Apr. 14, 1942

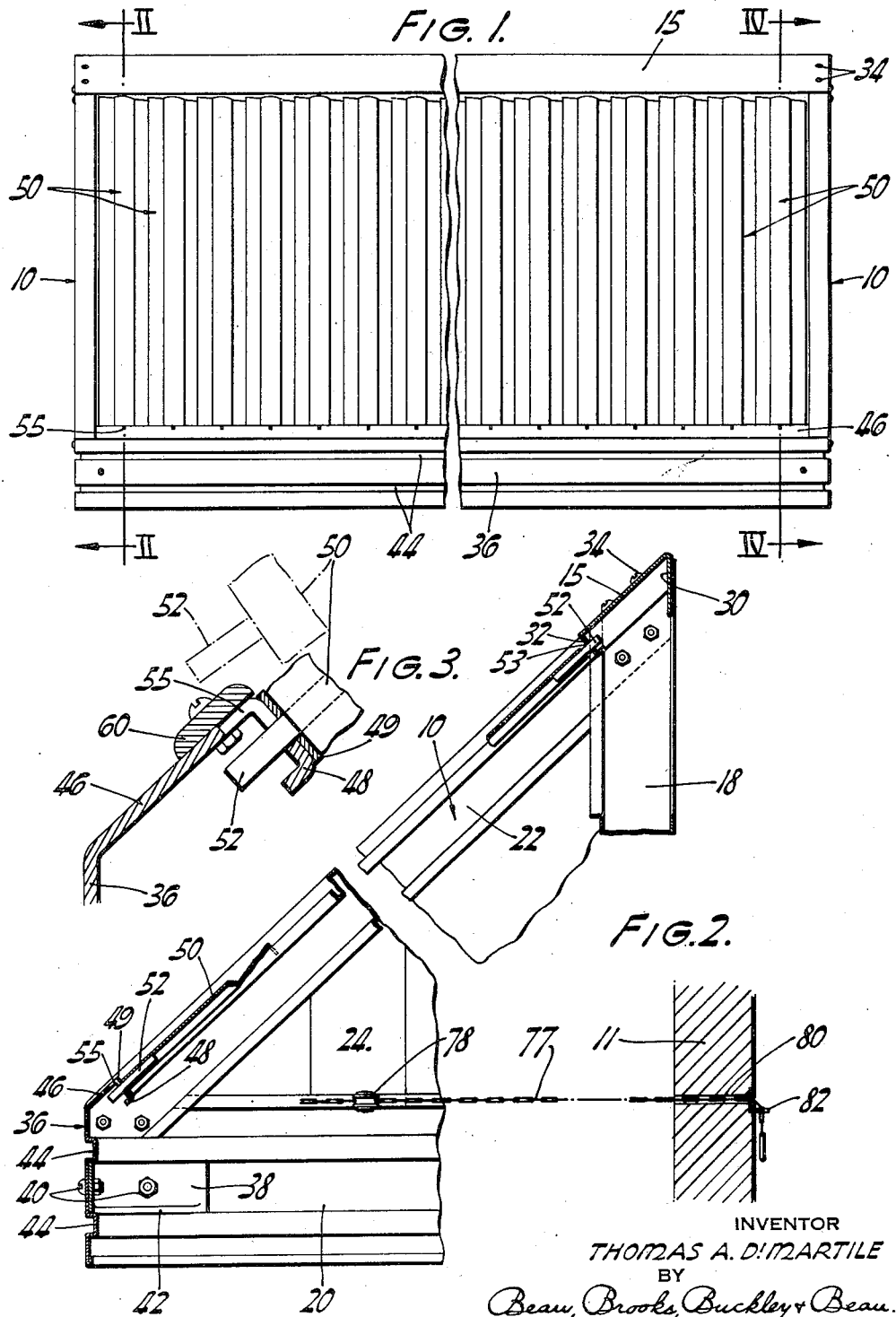

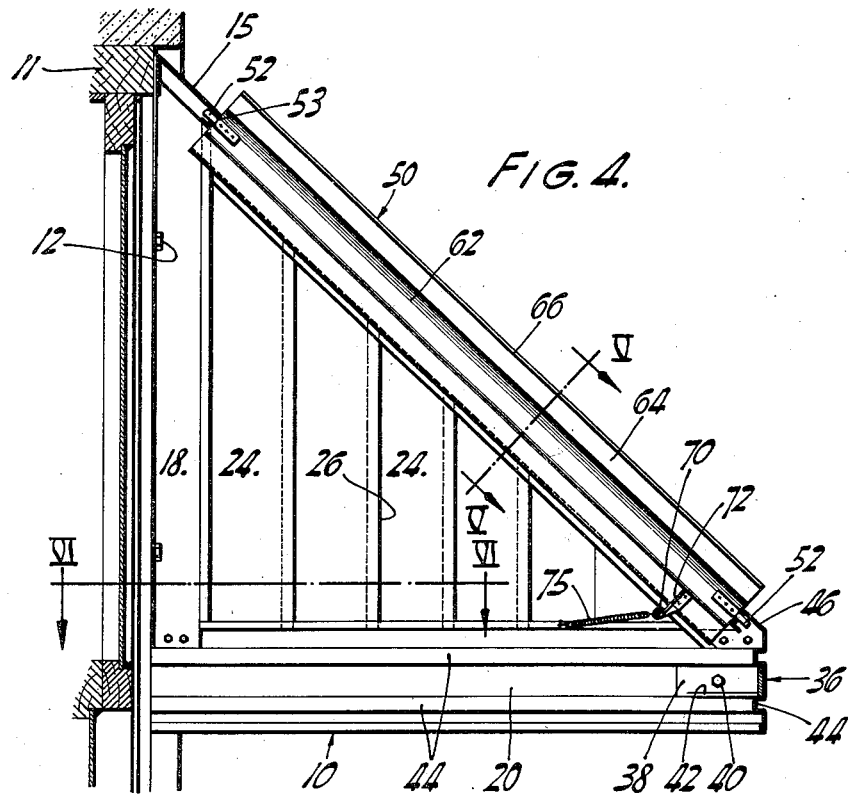
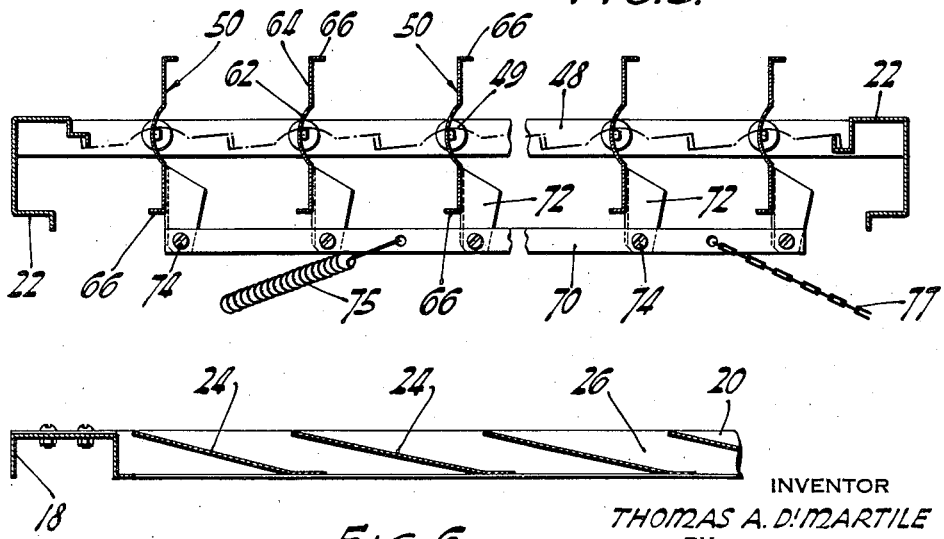

2,279,939

UNITED STATES PATENT OFFICE 2,279,939

LIGHT CONTROL DEVICE

Thomas A. Di Martile, Fort Erie, Ontario, Canada

Application January 10, 1940, Serial No. 313,275

2 Claims. (Cl. 156—15)

This invention relates to an improved light and/or air inlet control canopy for use in connection with windows, doorways, or other openings in building structures.

One object of the invention is to provide a novel device for projecting light from exteriorly of a building into the interior thereof through a wall opening by direct transmission and/or reflection processes in a controlled and improved manner. Another object of the invention is to provide a device which is capable of attaining the above object in addition to being adjustable to function in the manner of a window or doorway shade.

Another object of the invention is to provide a device capable of attaining the above mentioned objects, and in addition being adjustable to function as an improved rain or storm guard. Other objects and advantages will appear from the specification herein.

In the drawings:

Fig. 1 is a fragmentary front elevation of a device of the invention showing the movable inlet control elements thereof in closed position;

Fig. 2 is a fragmentary section through a portion of the device of Fig. 1, on an enlarged scale, taken along line II—II of Fig. 1;

Fig. 3 is a fragmentary section on an enlarged scale of a detail of Fig. 2;

Fig. 4 is a vertical section, on an enlarged scale, taken along line IV—IV of Fig. 1 but with the inlet control elements thereof set in open position;

Fig. 5 is a fragmentary section taken along line V—V of Fig. 4 showing two positions of adjustment of the control elements thereof; and Fig. 6 is a section along line VI—VI of Fig. 4.

The device of the invention is essentially in the form of a canopy adapted to be mounted upon the exterior wall of a building or the like and embracing the upper portion of a window or doorway opening or the like. Vertical end wall portions thereof with sloping upper edges extend laterally from the building wall, and a vertically inclined top portion spans the end members in such manner as to provide in combination therewith a visor-like structure about the upper portion of the window or door opening. The vertically inclined top portion of the device is provided with novel light and/or air inlet control elements which are provided with adjustment means whereby light and air may be admitted and projected through the device and through the adjacent window or door into the interior of the building in a novel and improved manner.

The light-air inlet devices are also so formed as to provide against unintended passage of rainwater therethrough.

As illustrated in the drawings, the invention comprises generally a pair of opposed end members 10 which are of triangular shape and mounted upon a building wall 11 as by means of lag screws 12 or the like in such manner that the end portions are substantially parallel to each other and extend outwardly from the wall 11 at right angles thereto. The end members 10 are similar and are each composed of three metal framing elements, including an upright wall attachment plate 18; a horizontally extending plate 20; and a vertically inclined plate 22 which is connected at its upper end to the upright plate 18 and at its lower end to the lower plate 20. The plate members 18, 20 and 22 are fabricated from sheet metal by bending into generally channel-like form, and are either permanently secured togeter as by means of welding or are detachably connected together as by means of screws or bolts, as may be preferred. The triangular space between the three framing elements 18, 20 and 22 is closed by means of a series of fixed louvre plates 24 which are set to flare outwardly in angular relation to the major plane of the end members (Fig. 6) so as to provide air inlet openings 26 therebetween without allowing substantial passage of rain or light therethrough. The louvre plates are rigidly mounted upon the framing elements at their opposite end portions by means of welding or detachable screws or bolts, or the like.

A top frame member 15 extends between and is mounted upon the end members 10 at the top end portions thereof. In order to brace the lower edge portion of the upper plate 15 against bending between the two lines of side support thereof the plate 15 is formed with turned upper and lower flange portions 30 and 32, respectively, to take out vertical bending stresses. The upper flange portions of the framing elements 22 are cut away at the extreme upper ends thereof to provide spaces between the rear flange portions of the upright elements 18 and the adjacent end portions of the framing elements 22 for reception therebetween of the upper flange portion 30 of the plate 15. Thus, when the framing elements of the structure are assembled in final form and the top plate 15 is bolted to the framing elements 22, as at 34, the structural elements are tightly nested and interlocked at the corners in permanently rigid manner.

A lower front plate 36 extends between and is connected to the end members 10 at the outer lower corner portions thereof by means of bolted connections to corresponding angle plates 38 (Fig. 2) which are mounted interiorly of the corner constructions thus provided by means of bolts 40. The angle members 38 are essentially V shaped elements having their opposite arms disposed at right angles to each other and a web 42 extending therebetween to brace the arms against bending. Thus, when the bottom plate 36 is connected to the end members 10 by means of the angle members 38 a rigid framing structure is completed. In order to stiffen the lower plate 36 against bending laterally, the material of the plate is preferably corrugated at at 44 (Fig. 2). The plate 36 is also formed with an integral upper edge flange portion 46 which is bent into line with the general plane of the sloping upper surface of the framing structure (Fig. 3), and at its extreme edge the portion 46 is downwardly bent in U fashion as at 48 to provide means for mounting thereon a series of light-air inlet control devices.

The light-air inlet control devices are in the form of a series of parallel elongated plate members 50 which are mounted upon the framing structure in such manner that their longitudinal axes extend vertically of the top plane of the framing structure. The plates 50 are pivotally mounted upon the frame structure for rotation about their longitudinal axes by means of pins 52 which are rigidly mounted upon and extend beyond the opposite end portions of the plates. To mount the plates 50 upon the framing structure a series of suitable openings 53 for receiving the upper end pins are formed in the lower plate portion 32 of the top plate 15, and a series of suitable slots 55 for receiving the lower end pins are formed in the U shaped portion 48 of the lower plate 36. Thus, subsequent to assembly of the framing elements of the device, each of the inlet control plates 50 may be conveniently mounted thereon by first inserting the extending end portion of the pin at the upper end of the plate 50 into the corresponding opening 53 in the plate portion 32. Then the plate 50 is moved upwardly and against the top plate 15, at which time the extending end portion of the lower pin 52 will register with and may be dropped into the slot 55 of the bottom plate 36. The plate 50 may then be released and under the forces of gravity will slide downwardly until the lower end portion of the plate 50 bears against the upper surface of the U portion 48 of the lower plate; the parts of the structure being so proportioned and dimensioned that when the plate 50 is in finally assembled position the pins 52 at both the upper and lower ends of the plate are locked against lateral displacement from the framing plate elements but are free to rotate in the sockets provided by the mounting openings. Washers 49 are preferably mounted upon the lower pins 52 between the lower plate 36 and the plates 50 to reduce friction therebetween. As illustrated in Fig. 3, a cover plate 60 may then be mounted upon the outer face of the plate portion 46 subsequent to assembly of the inlet control plates 50 thereon to cover the exposed portions of the slots 55, whereby the external appearance of the device is improved and an added guard against accidental displacement of the control plates 50 from the framing structure is provided.

As illustrated in Fig. 5, the inlet control plates 50 are essentially of rectangular plate form, but are of a special sectional shape formed by bending or pressing processes. Thus, as viewed in section the control plates 50 comprise central curved body portions 62; flat side portions 64; and turned edge flange portions 66. The flange portions 66 at opposite sides of the plates are turned in opposite directions for interlocking engagement with corresponding reversely turned flange portions of adjacent plate members when the plates are moved to closed portions, as illustrated by broken lines in Fig. 5. Thus, when in closed position, the control plates cooperate to present a light and water and air proof surface to the exterior of the device; the cooperating flange portions 66 serving to prevent leakage of light or air or water laterally through the device in the regions of contact between adjacent portions thereof.

To control passage of light through the device the plates 50 are coated at the sides thereof with a suitable light reflecting substance, or are otherwise treated to provide the desired form of light projection therefrom. For example, the sides of the plates 50 may be of highly polished metallic form or the like; or they may be coated with white paint or lacquer, or with any other color or form of coating composition whereby the desired type of light projection therefrom will be obtained. For use in most cases, however, I prefer to employ surfaces on the plates 50 such as will efficiently reflect all of the light incident thereto into the interior and at the same time impart a substantial degree of controlled diffusion so as to avoid introduction and/or transmission of glaring light into the interior of the building to which the devices are applied. Thus, a soft white paint or lacquer when applied to the surfaces of the plate 50 will be found to efficiently reflect substantially all of the light incident thereto when the plates are adjusted to their open positions as illustrated in Figs. 4 and 5 into the interior of the device but in a softened and diffused manner.

To provide for adjustment of the plates 50 to various positions for the purpose of picking up light rays from different angles relative to the device, as at different times of the day, the plates 50 are arranged to be rotated about their longitudinal axes in unison by means of manually controlled mechanism extending into the interior thereof and within convenient reach of the operator. For this purpose the plates 50 are shown as being interconnected by means of a cross bar 70 which is pivotally mounted upon extending arms 72 of the plates 50 by means of pivot pins 74. A coil spring 75 is connected at one end to the cross bar 70 and at the other end to a fixed portion of the framing structure; and the spring is so arranged as to normally draw the plates 50 into closed position. A pull device 77 is connected to the cross bar 70, and may be in the form of any suitable chain or cable or the like, and is threaded through a pulley 78 at one side of the framing structure and thence through the building wall as at 80 for convenient access thereto by the operator without being required to reach exteriorly of the building. A suitable catch 82 is also provided in connection with the building wall upon which the pull device 77 may be locked in different positions.

I am aware that certain window shade devices have heretofore employed shutter elements pivotally mounted for rotation about substantially horizontal axes, but it will be understood that such devices are incapable of functioning in the improved manner of the present invention and are incapable of providing the results thereof. For example, as a light reflecting and directing control medium the device of the invention is capable of being periodically adjusted so that side wall portions of the shutter elements thereof are presented to the major available source of light, such as the sun, as it moves across the sky from a position at one side of the canopy to a position at the other side thereof. At all times during this phase of the sun's movement, it is possible for the user of the invention to adjust the plates 50 in such manner that they will reflect the sun's rays in diffused manner in any desired direction into the interior of the adjacent building, whereas in the case of horizontal shutters the available range for tilting the reflected light therefrom is limited substantially to vertical changes. That is to say, the light control plates 50 of the invention may be positioned at any time during the day to reflect light incident thereto toward either end of the room into which the window or doorway opens and at the same time either upwardly or downwardly therefrom toward the ceiling or the floor, respectively, as may be desired. In the case of horizontally pivoted type shutters, the vertical type of reflected light shifting is substantially the only type of adjustment available to the user, and the direction of reflection in horizontal directions is substantially determined by the position of the source of light relative to the device and is not appreciably alterable by adjustments of the attitude of the shutters.

It will also be understood that by reason of the vertically inclined form of the pivotable shutter elements 50 as described hereinabove, the structural units of the invention provide marked advantages in connection with the problems of production of canopies of differing widths as measured between the opposed end portions 10 to suit different sized windows or the like. By reason of the construction of the invention the manufacturer may turn out the light control plates 50 in identical form and in large numbers, and the tie plates 15 and 36 of the framing structures may be dimensioned differently to suit the requirements of the installations to be made. The necessary number of control plates may then be mounted upon the framing structure as they are assembled to provide the required span; and thus the manufacture and assembly of units adapted to different sized openings is simplified and reduced in expense.

Although only one form of the invention has been shown and described in detail, it will be apparent to those skilled in the art that the invention is not so limited but that various changes may be made therein without departing from the spirit of the invention or the scope of the appended claims.

I claim:

1. In a canopy for windows and doorways, a framing portion disposed in vertically inclined position and including upper and lower rail members, a plurality of coacting adjustable shutter members pivotally mounted by means of extending pin portions at their upper and lower ends upon said rail members for rotation about their vertically inclined axes, said upper rail being provided with spaced openings in the lower face portion thereof for sliding reception of the upper of said pins therein, and said lower rail being provided with slot means for receiving in pivotal relation therein the lower of said pins, and detachable cover plate means mounted upon said lower rail for covering said slot means and locking said lower end pins in pivoted engagement with said lower rail.

2. In a canopy for windows and doorways, a framing portion disposed in vertically inclined position and including upper and lower rail members, a plurality of adjustable coacting shutter members pivotally mounted by means of extending pin portions at their upper and lower ends upon said rail members for rotation about their vertically inclined axes, said upper rail being provided with spaced openings in the lower face portion thereof for sliding reception of the upper of said pins therein, and said lower rail being provided with slot means for receiving in pivotal relation therein the lower of said pins.

THOMAS A. DI MARTILE.